Nov. 21, 1933.                J. D. TEAR                1,936,441
                        OSCILLATION GENERATOR
                    Filed Oct. 17, 1925        2 Sheets-Sheet 1
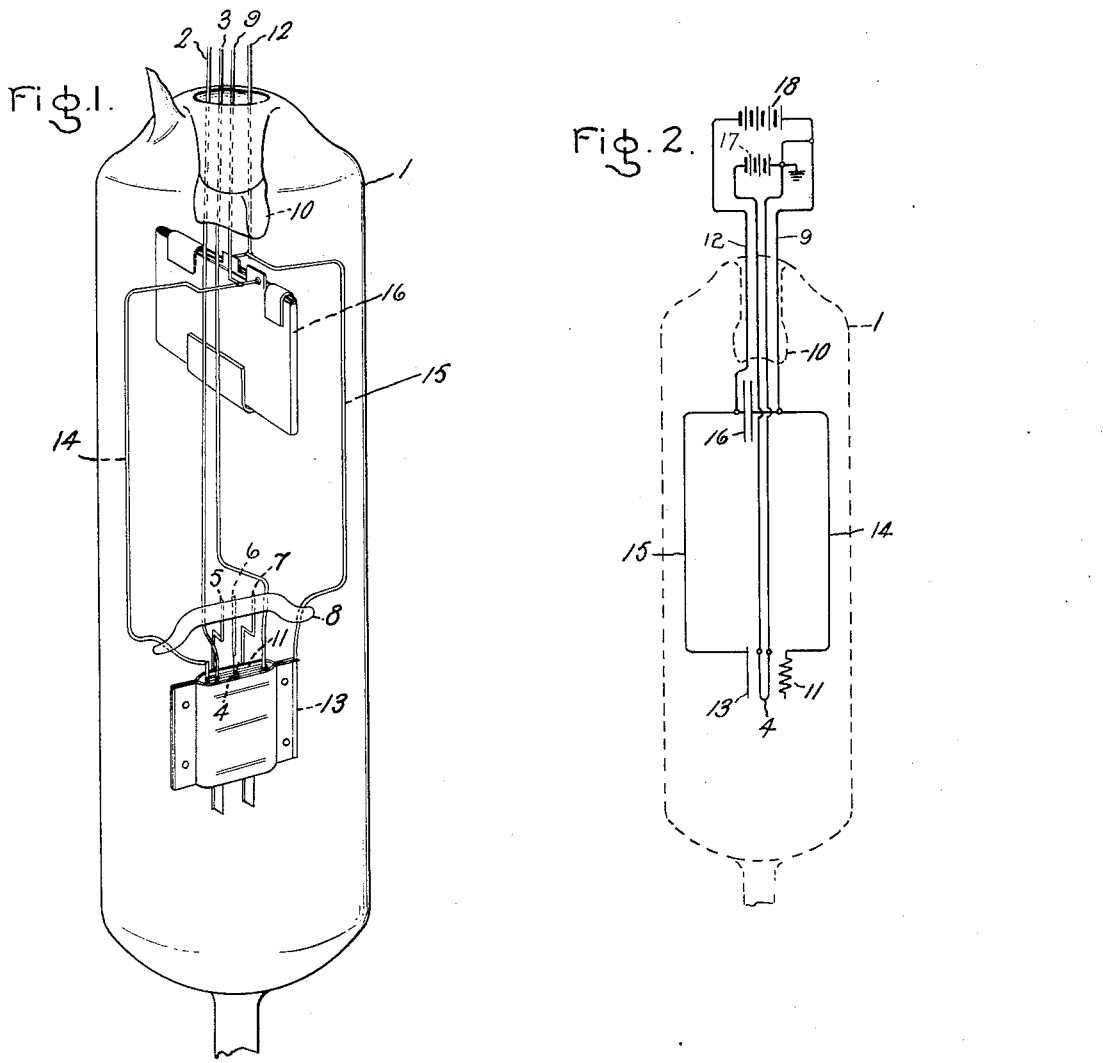
Inventor:
James D. Tear,
by
His Attorney.

Nov. 21, 1933.  J. D. TEAR  1,936,441
OSCILLATION GENERATOR
Filed Oct. 17, 1925  2 Sheets-Sheet 2
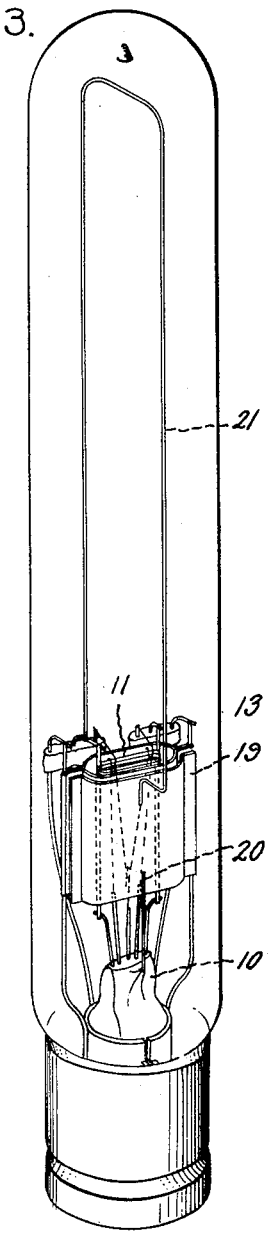
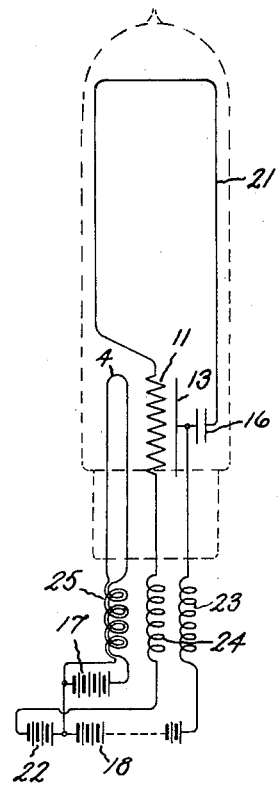
Inventor:
James D. Tear,
by *His Attorney.*

Patented Nov. 21, 1933

1,936,441

UNITED STATES PATENT OFFICE 1,936,441

OSCILLATION GENERATOR

James D. Tear, Schenectady, N. Y., assignor to General Electric Company, a corporation of New York Application October 17, 1925. Serial No. 63,100

6 Claims. (Cl. 250—27.5)

My present invention relates to oscillation generators of the thermionic type, and more particularly to oscillation generators adapted to generate very high frequencies.

In utilizing thermionic devices for the generation of very high frequency currents such as are desired for example for radio transmission of very short waves, difficulty is experienced in designing the circuits because of the fact that the inductance of the leads to the electrodes and the capacity between leads is so large that little external inductance and capacity can be used. There is therefore a practical limit to the frequency which can be successfully generated with any given thermionic device as previously constructed.

The object of my invention is to overcome this difficulty and provide a construction for thermionic oscillation generators which may be employed for generating as high frequencies as may be desired.

In carrying out my invention I enclose the oscillating circuit in the evacuated receptacle containing the electrodes of the thermionic device. By this expedient the inductance of the oscillatory circuit may be made as small as desired and the capacity of the circuit may also be readily controlled so that the oscillatory circuit may be designed to have as high a natural frequency as may be desired.

The novel features which I believe to be characteristic of my invention are pointed out with particularity in the appended claims, my invention itself, however, both as to its organization and method of operation will best be understood by reference to the following description taken in connection with the accompanying drawings in which Fig. 1 shows a thermionic device constructed in accordance with my invention; Fig. 2 is a diagrammatic representation of a circuit arrangement which may be used for producing oscillations by means of the device of Fig. 1; Fig. 3 shows a modified form of device, and Fig. 4 shows diagrammatically a circuit arrangement which may be used with the form shown in Fig. 3.

I have indicated in Fig. 1 of the drawings a thermionic device comprising an evacuated receptacle 1 into one end of which are sealed leading-in conductors 2 and 3 for supplying heating current to an electron emitting cathode 4, of double V-shape supported by supporting arms 5, 6 and 7, which are carried by a bridge 8 of insulating material.

The leading-in conductor 9, which is sealed into the stem 10, supplies current to the grid 11, and the leading-in conductor 12, which is also sealed into the stem 10, supplies current to the anode 13. The electrodes 4, 11 and 13, are supported from the bridge 8 at an appreciable distance from the seal 10 so that the current supply conductors 14 and 15, which form continuations of the leading-in conductors 9 and 12, are of appreciable length. These current supply conductors 14 and 15 are arranged to form a loop of a single turn. The condenser 16, which is supported inside the receptacle near the seal 10, is connected between current supply conductors 14 and 15 so that an oscillatory circuit is formed which comprises current supply conductors 14 and 15, capacity 16, and the capacity between the grid 11 and anode 13. The main purpose of condenser 16 is to form a blocking condenser to keep the plate voltage away from the grid. The capacity of condenser 16 is large in comparison with the anode-grid capacity and its reactance is small in comparison to the inductive reactance of conductors 14 and 15 so that it does not appreciably affect the natural frequency of the oscillating circuit. By suitable proportioning of the supply conductors 14 and 15 and capacity 16, and the anode-grid capacity, the oscillatory circuit may be constructed to have any frequency desired. The oscillations generated may be supplied to a load circuit by any suitable form of coupling located outside of the receptacle 1. The battery 17, which supplies heating current to the cathode 4, has one terminal grounded. A source of potential 18 supplies energy to the oscillatory circuit. The leading-in conductors, are arranged in a plane extending substantially at right angles to the plane of the loop so that no high frequency currents will be induced in the leads. Such a plane bisects the loop on a line which substantially includes the filament and a node in the oscillatory circuit. The leads for the filament extend substantially parallel to the loop and are arranged approximately equidistant from the sides 14 and 15 of the loop so that the high frequency potential of the filament with respect to the control electrode and anode may be accurately controlled. The leads 9 and 12 are also connected to a node in the oscillatory circuit so that no appreciable high frequency potential difference is set up between them. By this arrangement all of the leads to the device are at substantially zero potential with respect to the high frequency current so that there is no loss of high frequency current by reason of the capacity between the leads. Further at the seal all of the energy supply conductors are electrically connected together by their inherent capacity whereby a definite phase relation between the grid and anode electromotive forces with respect to the cathode is maintained by the oscillatory circuit.

In the form of device shown in Fig. 3, the electrodes are supported near the seal 10. The blocking condenser in this case is formed by means of a plate 19, which is supported by a supporting arm 20 in close parallel relation to one side of the anode 13. The inductance of the oscillatory circuit is made up of a loop of wire 21 connected to the plate 19 of the blocking condenser and to the grid 11.

In the circuit arrangement shown in Fig. 4, I have also indicated a biasing battery 22 for providing suitable negative bias on the grid 11. Such biasing potential may of course be used in the arrangement shown in Fig. 2. In this case, the leads of the tube are not all at zero potential with respect to the high frequency currents generated, therefore it is desirable to connect chokes 23, 24 and 25 in the leads close to the device.

What I claim as new and desire to secure by Letters Patent of the United States, is,—

1. An oscillation generator comprising an electron discharge device having an electron emitting cathode, an anode and a control electrode enclosed in an evacuated receptacle, and an oscillatory circuit connected to said electrodes and entirely enclosed in the receptacle, said oscillatory circuit being made up of a single turn of wire and series capacity and the current supply conductors to said electrodes being located in a plane extending at a right angle to the plane of the single turn of wire.

2. An electron discharge device comprising an electron emitting cathode and an anode and a control electrode enclosed in an evacuated receptacle, current supply conductors for said electrodes sealed into said receptacle, an oscillatory circuit comprising a single turn of wire enclosed in said receptacle and connected to said electrodes, said turn of wire being located in a plane at a right angle to the plane of the current supply conductors where they pass through the seal.

3. An electron discharge device comprising an electron emitting cathode, an anode and a control electrode enclosed in an evacuated receptacle, current supply conductors for said electrodes, an oscillatory circuit comprising a turn of wire enclosed in said receptacle and including the anode and control electrode, said supply conductors being located in a plane substantially perpendicular to the plane of said turn of wire and passing approximately through a node in the oscillatory circuit.

4. An electron discharge device comprising an electron emitting cathode, an anode and a control electrode enclosed in an evacuated receptacle, current supply conductors for said electrodes, an oscillatory circuit comprising a turn of wire enclosed in said receptacle and including the anode and control electrode, said supply conductors being located in a plane substantially perpendicular to the plane of the said turn of wire, said plane passing through the filament and a node in the oscillatory circuit.

5. An oscillation generator comprising an electron discharge device having an electron emitting cathode, an anode and a control electrode enclosed in an evacuated receptacle, current supply conductors connected to said electrodes, an oscillatory circuit comprising a turn of wire enclosed in said receptacle and including the anode and control electrode, the supply conductors for the electron emitting electrode extending substantially parallel to the plane of the turn of wire and across said turn of wire and being mounted substantially equidistant from opposite sides of the oscillatory circuit.

6. An electron discharge device comprising an evacuated receptacle having an electron emitting cathode, an anode, a control electrode and a resonant oscillatory circuit connecting the anode and control electrode, and energy supply conductors for said grid and anode connected to said oscillatory circuit at a nodal point of voltage and extending through the wall of said receptacle whereby said energy supply conductors are maintained substantially free from alternating electromotive force with respect to said cathode, and energy supply conductors for said electron emitting cathode extending through said wall in close proximity to said first mentioned energy supply conductors whereby all of said energy supply conductors are electrically connected together by the inherent capacity between said conductors and said wall and the electromotive forces on said grid and anode with respect to said cathode are maintained in definite phase relation by said oscillatory circuit.

JAMES D. TEAR.